US012598169B2

(12) United States Patent
     Gunalan et al.

(10) Patent No.: US 12,598,169 B2
(45) Date of Patent: Apr. 7, 2026

(54) SYSTEM AND METHOD FOR EARLY DETECTION OF DUPLICATE SECURITY ASSOCIATION OF IPsec TUNNELS

(71) Applicant: Cisco Technology Inc., San Jose, CA (US)

(72) Inventors: Anbu Chezhian Gunalan, San Jose, CA (US); Chennakesava Reddy Gaddam, Bengaluru (IN); Annu Singh, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 18/593,001

(22) Filed: Mar. 1, 2024

(65) Prior Publication Data

US 2025/0233854 A1      Jul. 17, 2025

Related U.S. Application Data

(60) Provisional application No. 63/620,578, filed on Jan. 12, 2024.

(51) Int. Cl.
    *H04L 29/06*       (2006.01)
    *H04L 9/40*        (2022.01)
(52) U.S. Cl.
    CPC .................................. *H04L 63/061* (2013.01)
(58) Field of Classification Search
    CPC ........................... H04L 63/061; H04W 12/069
    See application file for complete search history.

(56) References Cited

U.S. PATENT DOCUMENTS

2004/0049585 A1* 3/2004 Swander ............... H04L 63/164
                                                          726/1
2007/0204160 A1* 8/2007 Chan ..................... H04L 9/0838
                                                          713/171

(Continued)

FOREIGN PATENT DOCUMENTS

WO        2023060425 A1      4/2023

OTHER PUBLICATIONS

Juniper Networks: "Internet Key Exchange (IKE) for IPsec VPN", Junos OS, Dec. 18, 2023, pp. 1-42.

(Continued)

*Primary Examiner* — Dao Q Ho
(74) *Attorney, Agent, or Firm* — Baker Botts L.L.P.

(57) ABSTRACT

In an embodiment, a method includes transmitting an initiation request from a first electronic device to a second electronic device, the initiation request being associated with a notification that the first electronic device is capable of early detection of duplicate security associations (SAs), receiving an initiation request from the second electronic device at the first electronic device, the initiation request being associated with a capability notification that the second electronic device is capable of early detection of duplicate SAs, determining a possibility of duplicate SAs by the first electronic device, transmitting responses configured to prevent duplicate SAs from the first electronic device to the second electronic device, receiving responses at the first electronic device from the second electronic device, wherein the responses indicate no duplicate SAs created by the second electronic device, and establishing a non-duplicate SA for the first and second electronic devices.

20 Claims, 7 Drawing Sheets

200

(56) References Cited

U.S. PATENT DOCUMENTS

| | | | |
|---|---|---|---|
| 2010/0296481 A1* | 11/2010 | Weniger ................ | H04L 63/162 |
| | | | 370/328 |
| 2011/0066858 A1* | 3/2011 | Cheng ................... | H04L 63/164 |
| | | | 713/171 |
| 2020/0366478 A1* | 11/2020 | Mestery ................ | H04L 63/164 |
| 2021/0273799 A1* | 9/2021 | Kampati .............. | H04L 9/0825 |
| 2022/0224529 A1* | 7/2022 | Mestery ............. | H04L 12/4641 |
| 2025/0097027 A1* | 3/2025 | Liu ....................... | H04L 63/164 |

OTHER PUBLICATIONS

Kaufman C., et al., "Internet Key Exchange Protocol Version 2 (IKEv2)", Internet Engineering Task Force (IETF), Request for Comments: 7296, Standards Track, Oct. 2014, pp. 1-142.

* cited by examiner

<u>100</u>

200

<u>500</u>

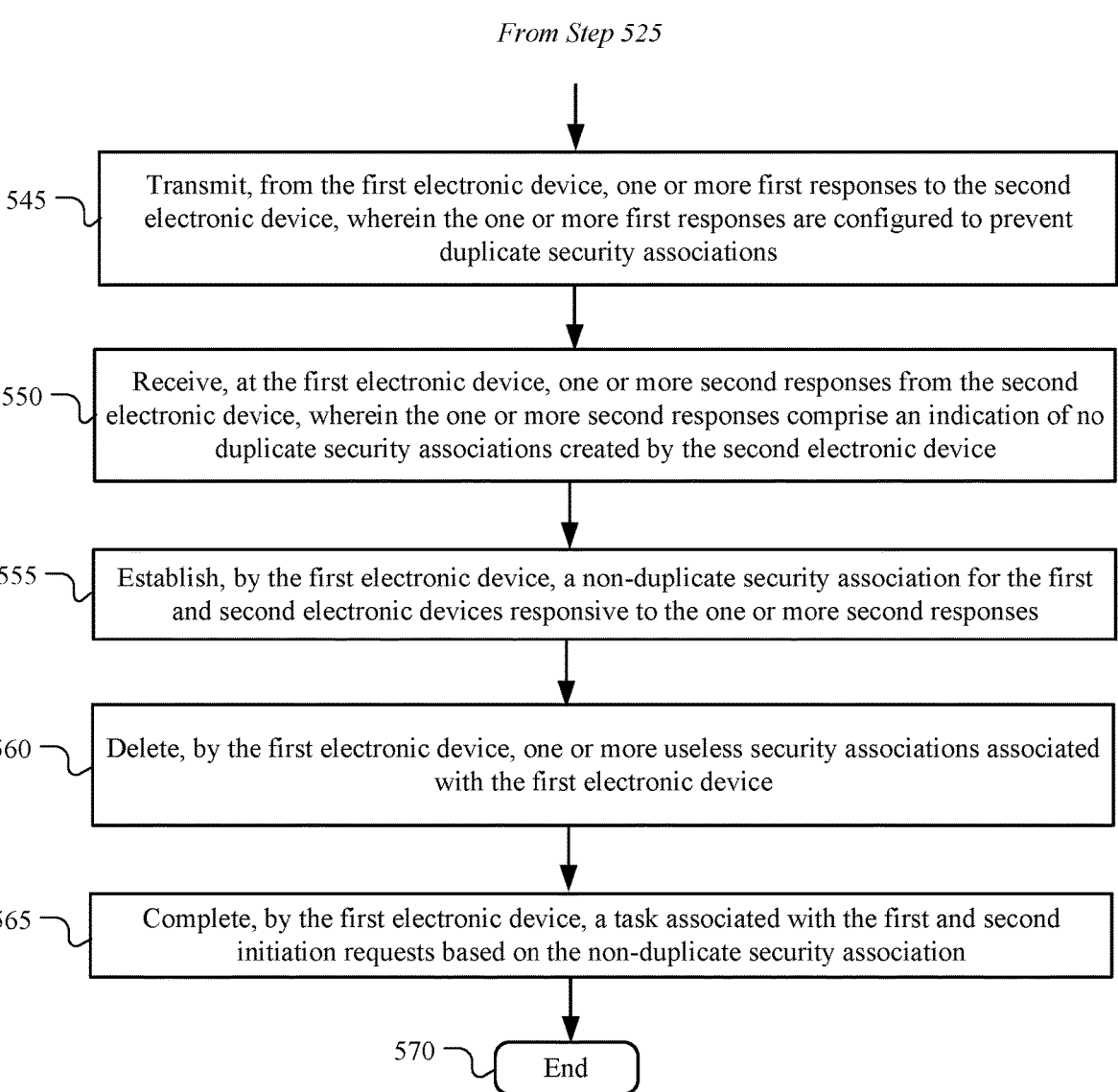

*From Step 525*

545 — Transmit, from the first electronic device, one or more first responses to the second electronic device, wherein the one or more first responses are configured to prevent duplicate security associations 550 — Receive, at the first electronic device, one or more second responses from the second electronic device, wherein the one or more second responses comprise an indication of no duplicate security associations created by the second electronic device 555 — Establish, by the first electronic device, a non-duplicate security association for the first and second electronic devices responsive to the one or more second responses 560 — Delete, by the first electronic device, one or more useless security associations associated with the first electronic device 565 — Complete, by the first electronic device, a task associated with the first and second initiation requests based on the non-duplicate security association 570 — End

FIG. 5B

SYSTEM AND METHOD FOR EARLY DETECTION OF DUPLICATE SECURITY ASSOCIATION OF IPsec TUNNELS

PRIORITY

This application claims the benefit, under 35 U.S.C. § 119(e), of U.S. Provisional Patent Application No. 63/620, 578, filed 12 Jan. 2024, which is incorporated herein by reference.

TECHNICAL FIELD

The present disclosure generally relates to secure network communication, and more specifically to systems and methods for efficient usage of system resources in secure network communication.

BACKGROUND

In computing, Internet Protocol Security (IPsec) is a secure network protocol suite that authenticates and encrypts packets of data to provide secure encrypted communication between two computers over an Internet Protocol network. It is used in virtual private networks (VPNs). IPsec includes protocols for establishing mutual authentication between agents at the beginning of a session and negotiation of cryptographic keys to use during the session. IPsec can protect data flows between a pair of hosts (host-to-host), between a pair of security gateways (network-to-network), or between a security gateway and a host (network-to-host). IPsec uses cryptographic security services to protect communications over Internet Protocol (IP) networks. It supports network-level peer authentication, data origin authentication, data integrity, data confidentiality (encryption), and replay protection (protection from replay attacks).

In computing, Internet Key Exchange (IKE, versioned as IKEv1 and IKEv2) is the protocol used to set up a security association (SA) in the IPsec protocol suite. IKE builds upon the Oakley protocol and ISAKMP. IKE, IKEv2 uses the Diffie-Hellman key exchange method in the initial phase to securely establish a shared secret between the initiator and responder for encryption of the subsequent authentication process. IKE, IKEv2 authentication methods include support for pre-shared keys, X.509 certificates and EAP. In addition, a security policy for every peer which will connect must be manually maintained.

BRIEF DESCRIPTION OF THE DRAWINGS

FIGS. 5A-5B illustrate a flow diagram of a method for early detection of duplicate SA, in accordance with certain embodiments.

DESCRIPTION OF EXAMPLE EMBODIMENTS

Overview

Figure 1:
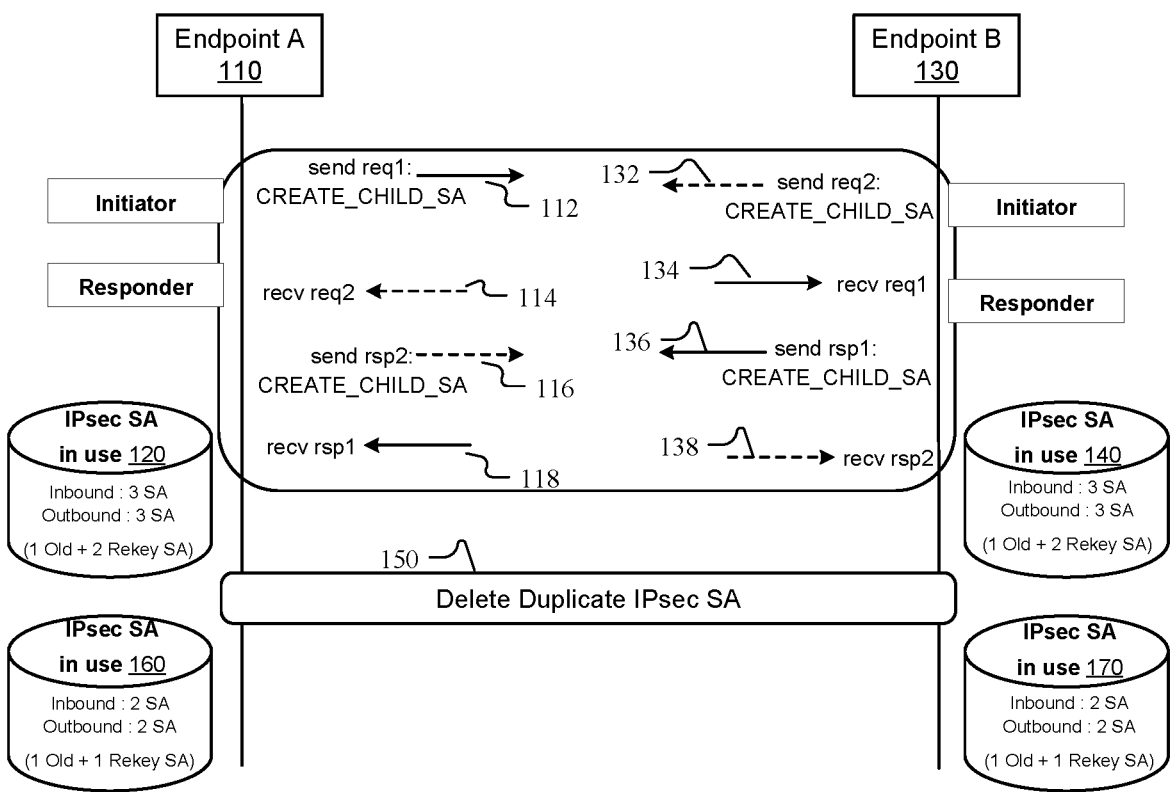
FIG. 1 illustrates a sequence diagram for simultaneous IPsec SA rekeying in conventional systems, in accordance with certain embodiments.

According to an embodiment, a system may include one or more processors and one or more computer-readable non-transitory storage media comprising instructions that, when executed by the one or more processors, cause one or more components of the system to perform operations. The operations may include transmitting a first initiation request from a first electronic device to a second electronic device. The first initiation request may be associated with a first capability notification that the first electronic device is capable of early detection of duplicate security associations. The operations may also include receiving a second initiation request from the second electronic device at the first electronic device. The second initiation request may be associated with a second capability notification that the second electronic device is capable of early detection of duplicate security associations. The operations may additionally include determining a possibility of one or more duplicate security associations by the first electronic device based on the second initiation request. The operations may also include transmitting one or more first responses from the first electronic device to the second electronic device. The one or more first responses may be configured to prevent duplicate security associations. The operations may also include receiving one or more second responses at the first electronic device from the second electronic device. The one or more second responses may include an indication of no duplicate security associations created by the second electronic device. The operations may further include establishing a non-duplicate security association for the first and second electronic devices responsive to the one or more second responses.

In certain embodiments, the operations may include determining a first nonce associated with the first initiation request is higher than a second nonce associated with the second initiation request by the first electronic device.

The first electronic device and the second electronic device may be associated with a secure tunnel. In some embodiments, the non-duplicate security association may be established for the secure tunnel.

In certain embodiments, the one or more first responses may include an error notification indicating one or more duplicate security associations being detected.

The first electronic device may function as both an initiator and a responder. The second electronic device may also function as both an initiator and a responder.

The first and second initiation requests may be associated with a particular task. The operations may include completing the task based on the non-duplicate security association.

In certain embodiments, the first and second initiation requests may be associated with a task of simultaneous SA rekeying. The first or second initiation request may include a child SA rekey request. The one or more second responses may include a response indicating standard creation of child SA. In some embodiments, the operations may include deleting an old child SA associated with the first electronic device by the first electronic device and transmitting a request from the first electronic device to the second electronic device to delete an old child SA associated with the second electronic device.

In certain embodiments, the first and second initiation requests may be associated with a task of simultaneous SA initial exchange. The first or second initiation request may include an SA initiation request. The one or more first responses may include a response indicating a support for childless IKE by the first electronic device. In some embodiments, the operations may include transmitting an IKE authorization request from the first electronic device to the second electronic device and receiving a modified IKE authorization request without a child SA from the second electronic device at the first electronic device. The one or more first responses may further include an IKE authorization by the first electronic device and the one or more second responses include an IKE authorization by the second electronic device. In some embodiments, the operations may further include receiving a request from the second electronic device to delete a childless IKE SA associated with the first electronic device at the first electronic device and deleting the childless IKE SA associated with the first electronic device by the first electronic device.

According to another embodiment, a method may include transmitting a first initiation request from a first electronic device to a second electronic device. The first initiation request may be associated with a first capability notification that the first electronic device is capable of early detection of duplicate security associations. The method may also include receiving a second initiation request from the second electronic device at the first electronic device. The second initiation request may be associated with a second capability notification that the second electronic device is capable of early detection of duplicate security associations. The method may also include determining a possibility of one or more duplicate security associations by the first electronic device based on the second initiation request. The method may also include transmitting one or more first responses from the first electronic device to the second electronic device. The one or more first responses may be configured to prevent duplicate security associations. The method may also include receiving one or more second responses at the first electronic device from the second electronic device. The one or more second responses may include an indication of no duplicate security associations created by the second electronic device. The method may further include establishing a non-duplicate security association for the first and second electronic devices responsive to the one or more second responses.

According to yet another embodiment, one or more computer-readable non-transitory storage media may embody instructions that, when executed by a processor, cause the performance of operations. The operations may include transmitting a first initiation request from a first electronic device to a second electronic device. The first initiation request may be associated with a first capability notification that the first electronic device is capable of early detection of duplicate security associations. The operations may also include receiving a second initiation request from the second electronic device at the first electronic device. The second initiation request may be associated with a second capability notification that the second electronic device is capable of early detection of duplicate security associations. The operations may additionally include determining a possibility of one or more duplicate security associations by the first electronic device based on the second initiation request. The operations may also include transmitting one or more first responses from the first electronic device to the second electronic device. The one or more first responses may be configured to prevent duplicate security associations. The operations may also include receiving one or more second responses at the first electronic device from the second electronic device. The one or more second responses may include an indication of no duplicate security associations created by the second electronic device. The operations may further include establishing a non-duplicate security association for the first and second electronic devices responsive to the one or more second responses.

Technical advantages of certain embodiments of this disclosure may include one or more of the following. The systems and methods described herein may optimize hardware SA resource consumption per physical port (PHY), and in turn reduce the number of programming operations. The systems and methods described herein may avoid programming of redundant security associations and thus help achieve better secure tunnel scale support.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In certain embodiments, a method for optimizing hardware SA resource consumption per physical layer (PHY), and in turn reducing the number of programming operations is provided. Hardware resources are always limited, and it is important to optimize the usage of encryption security associations to achieve better scale numbers. The method may include early duplicate SA management to save system resources and ensure to allow each endpoint to initiate the security associations independently and save the system resources. In certain embodiments, early duplicate SA management means detect duplicate SAs before programming them into the hardware. In a scaled setup, early duplicate SA detection may help avoid programming of redundant security associations and thus help achieve better secure tunnel scale support. In one example embodiment, each individual tunnel can rekey simultaneously without any implementation specific approaches to stagger the rekey. Only one new Rekey (refreshed key) SA may be programmed as part of simultaneous child SA rekey process. In certain embodiments, a child SA may comprise the actual IPsec SAs describing the algorithms and keys used to encrypt and authenticate the traffic. The child SA rekey process may refresh key material. In another example embodiment, no redundant IPsec SA may get programmed as part of simultaneous initial exchange.

In IKEv2, either endpoint can initiate an exchange, which can cause two pairs of SA to be programmed for the same endpoint before the duplicate SA is realized and deleted. In case of a scaled setup, multiple IPsec SA rekeying collisions can happen in parallel. As per Request For Comments (RFC) 7296, which is incorporated herein by reference, conventional duplicate detection may happen only after successful SA programming, which may cause a system to consume two extra SA resources instead of one to support the rekey procedure.

To achieve the secure tunnel scale using PHY based IPsec, the embodiments disclosed herein may optimize the hardware security-association resource consumption per PHY, and in turn reduce the number of messages exchanges over wire, and the number of operations (both cryptographic and programming) performed.

Consider the following two examples where the issue of the system consuming extra SA resources may happen. FIG. 1 illustrates a sequence diagram 100 for simultaneous IPsec SA rekeying in conventional systems, in accordance with certain embodiments. Endpoint A 110 and endpoint B 130 each represents a physical device that connects to a network.

In certain embodiments, endpoint A 110 and endpoint B 130 may both act as initiator and responder. As initiator, endpoint A 110 may send a request (e.g., req1: CREATE_CHILD_SA) to endpoint B 130 at operation 112. As initiator, endpoint B 130 may send a request (e.g., req2: CREATE_CHILD_SA) to endpoint A 110 at operation 132. As responder, endpoint A 110 may receive the request (e.g., req2) at operation 114. As responder, endpoint B 130 may receive the request (e.g., req1) at operation 134. Endpoint B 130 may send a response (e.g., rsp1: CREATE_CHILD_SA) at operation 136. Endpoint A 110 may send a response (e.g., rsp2: CREATE_CHILD_SA) at operation 116. Endpoint A 110 may receive a response (e.g., rsp1) at operation 118. Endpoint B 130 may receive a response (e.g., rsp2) at operation 138.

To this end, IPsec SA in use 120 for endpoint A 110 may include 3 SA (1 old and 2 rekey SA) for inbound and 3 SA (1 old and 2 rekey SA) for outbound. IPsec SA in use 140 for endpoint B 130 may include 3 SA (1 old and 2 rekey SA) for inbound and 3 SA (1 old and 2 rekey SA) for outbound.

The conventional systems may then delete duplicate IPsec SA for both endpoint A 110 and endpoint B 130 at operation 150. Subsequently, IPsec SA in use 160 for endpoint A 110 may include 2 SA (1 old and 1 rekey SA) for inbound and 2 SA (1 old and 1 rekey SA) for outbound. IPsec SA in use 170 for endpoint B 130 may include 2 SA (1 old and 1 rekey SA) for inbound and 2 SA (1 old and 1 rekey SA) outbound.

As may be seen, concurrent IPsec SA rekey may consume an extra security association until the duplicate detection happens, which may reduce the scale of IPsec tunnels. In addition, concurrent IPsec SA rekey consuming an extra security association until the duplicate detection happens may result in many redundant programming operations, e.g., install and delete, for the duplicate IPsec SAs. Assuming the PHY has 2048 SAs, and accounting for an extra SA required during rekey, the PHY can support 1024 tunnels. However, during simultaneous rekeying, 3 SAs may be consumed, which brings the scale number to about 680.

Figure 2:
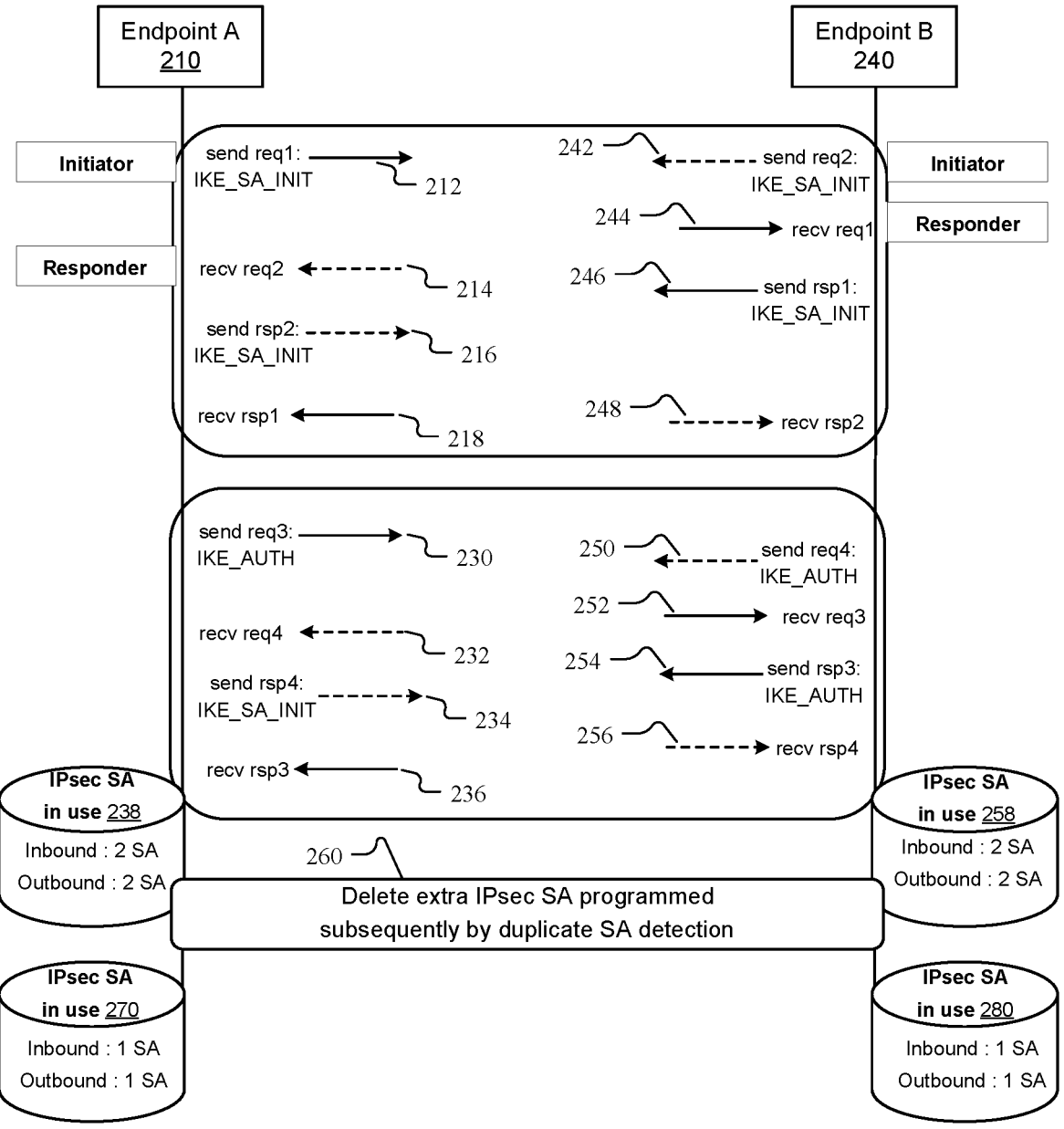
FIG. 2 illustrates a sequence diagram for simultaneous SA initial exchange in conventional systems, in accordance with certain embodiments.

FIG. 2 illustrates a sequence diagram 200 for simultaneous SA initial exchange in conventional systems, in accordance with certain embodiments. Endpoint A 210 and endpoint B 240 may both act as initiator and responder. As initiator, endpoint A 210 may send a request (e.g., req1: IKE_SA_INIT) to endpoint B 240 at operation 212. As initiator, endpoint B 240 may send a request (e.g., req2: IKE_SA_INIT) to endpoint A 210 at operation 242. As responder, endpoint A 210 may receive a request (e.g., req2) at operation 214. As responder, endpoint B 240 may receive a request (e.g., req1) at operation 244. Endpoint B 240 may send a response (e.g., rsp1: IKE_SA_INIT) at operation 246. Endpoint A 210 may send a response (e.g., rsp2: IKE_SA_INIT) at operation 216. Endpoint A 210 may receive a response (e.g., rsp1) at operation 218. Endpoint B 240 may receive a response (e.g., rsp2) at operation 248.

Endpoint A 210 may then send another request (e.g., req3: IKE_AUTH) to endpoint B at operation 230. Endpoint B 240 may send another request (e.g., req4: IKE_AUTH) to endpoint A 210 at operation 250. Endpoint A 210 may receive a request (e.g., req4) at operation 232. Endpoint B 240 may receive a request (e.g., req3) at operation 252. Endpoint B 240 may send another response (e.g., rsp3: IKE_AUTH) at operation 254. Endpoint A 210 may send another response (e.g., rsp4: IKE_SA_INIT) at operation 234. At operation 236, endpoint A 210 may receive a response (e.g., rsp3). At operation 256, endpoint B 240 may receive a response (e.g., rsp4).

To this end, IPsec SA in use 238 for endpoint A 210 may include 2 SAs for inbound and outbound, respectively. IPsec SA in use 258 for endpoint B 240 may include 2 SAs for inbound and outbound, respectively. The conventional systems may then delete extra IKE SA and associated IPsec SAs programmed based on duplicate SA detection at operation 260. Subsequently, IPsec SA in use 270 for endpoint A 210 may include 1 SA for inbound and outbound, respectively. IPsec SA in use 280 for endpoint B 240 may include 1 SA for inbound and outbound, respectively.

As illustrated in FIG. 2, redundant IPsec SA programming may install the pair of ingress and egress SAs, only for the duplicate IPsec SAs to be deleted, which may cause four additional messages to be exchanged over the wire. During such exchange, as part of duplicate IKE SA, two additional programming operations may be called to install another pair of ingress and egress SAs, only for the pair to be deleted with further exchange of delete requests and acknowledgements. In a scaled setup, conventional systems may experience many redundant programming operations, e.g., install and delete, for the duplicate IPsec SAs.

A possible approach of avoiding duplicate SAs may be by fixing the roles of the endpoints (initiator versus responder). However, this approach may limit the deployments such as data center interconnect (DCI) or dynamic secure tunnels, in which cases both endpoints may initiate IPsec SAs. Technically advantageous to this aforementioned approach, the embodiments disclosed herein utilize early duplicate SA management to save system resources by allowing each endpoint to initiate the SAs independently.

In particular embodiments, to avoid duplicate SAs, particular notification messages may be utilized. As an example and not by way of limitation, one notification message may be a capability notification to be advertised as part of the IKE SA initiation exchange. The capability notification from an endpoint may indicate that the end point has the capability of early detection of duplicate SA. For example, the format of this notification message may be an early duplication SA detection (EARLY_DUP_SA_DETECTION) message. In case of simultaneous exchanges, this message may allow the endpoints to take an early decision regarding which of the parallel transaction may culminate in an SA and the graceful termination of the other. As another example and not by way of limitation, another notification message may be an error notification to be sent by the responder on early concurrent SA detection. For example, the format of this message may be DUP_SA_DETECTED.

Figure 3:
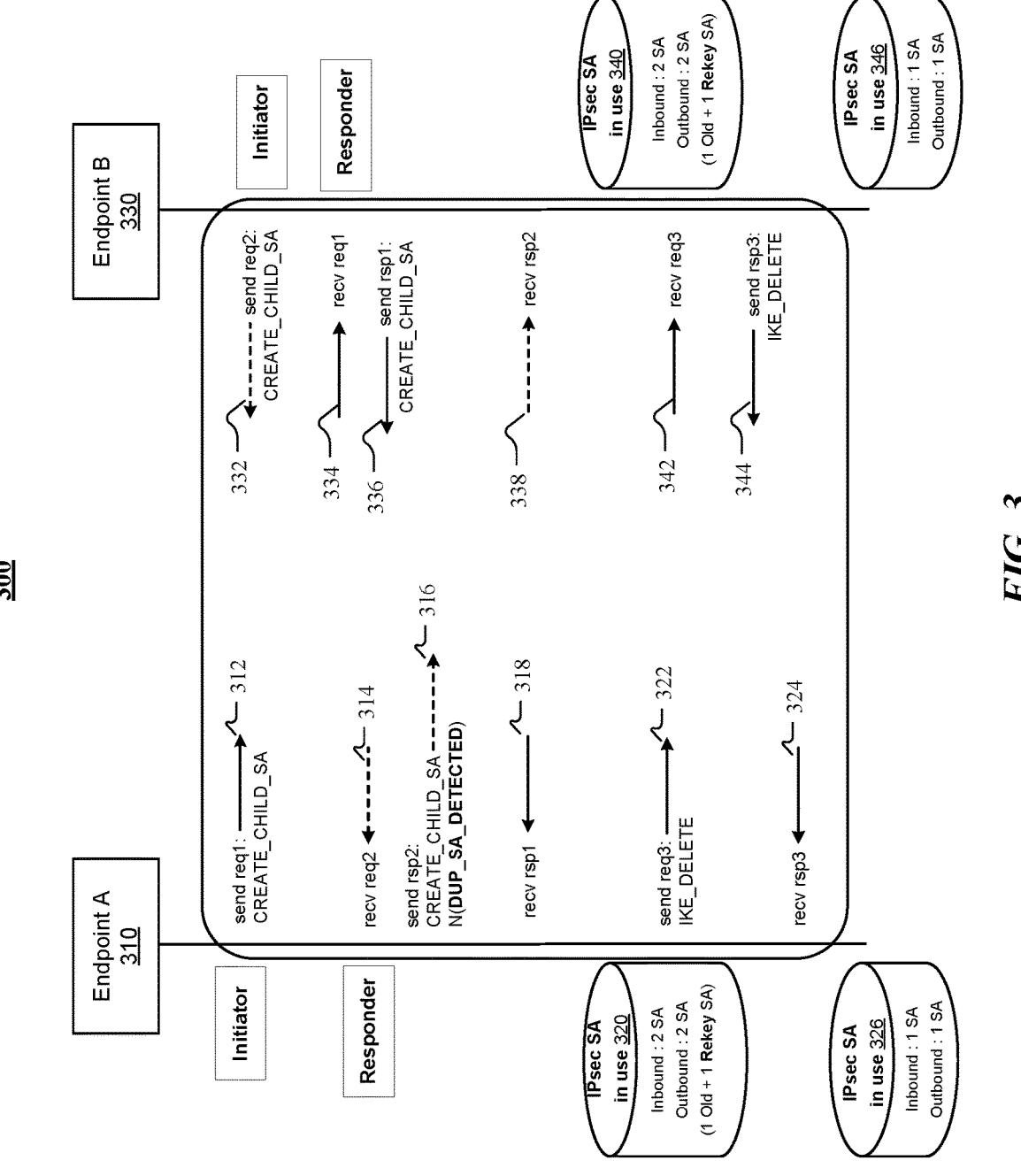
FIG. 3 illustrates a sequence diagram for simultaneous IPsec SA rekeying, in accordance with certain embodiments.

FIG. 3 illustrates a sequence diagram 300 for simultaneous IPsec SA rekeying, in accordance with certain embodiments. In certain embodiments, endpoint A 310 may be the first electronic device whereas endpoint B 330 may be the second electronic device. Both participants, e.g., endpoint A 310 and endpoint B 330, may advertise an early duplication SA detection (e.g., EARLY_DUP_SA_DETECTION) capability in an SA initiation request (e.g., SA_INIT). Both participants, e.g., endpoint A 310 and endpoint B 330, may act as initiator and responder.

At operation 312, endpoint A 310 may send a child SA rekey request to endpoint B 330 (e.g., req1: CREATE_CHILD_SA). At operation 332, endpoint B 330 may send a child SA rekey request to endpoint A 310 (e.g., req2: CREATE_CHILD_SA). As an example and not by way of limitation, the first initiation request may include the child SA rekey request from endpoint A 310 whereas the second initiation request may include the child SA rekey request from endpoint B 330.

At operation 314, endpoint A 310 may receive the child SA rekey request from endpoint B 330 and become aware of the simultaneous rekey. At operation 334, endpoint B 330 may receive the child SA rekey request from endpoint A 310 and also become aware of the simultaneous rekey.

Once an endpoint detects a simultaneous child rekey, the endpoint may compare the nonce sent in its CREATE_CHILD_SA request with the nonce received in the peer-initiated request. CREATE_CHILD_SA request with the greater nonce may continue with standard CREATE_CHILD_SA response. The endpoint with higher nonce which receives the lower nonce in the CREATE_CHILD_SA request may respond with DUP_SA_DETECTED error notification.

At operation 316, endpoint A 310 may respond with DUP_SA_DETECTED failure notification since endpoint B 330 has lower nonce. As an example and not by way of limitation, the one or more first responses may include the DUP_SA_DETECTED failure notification.

At operation 336, endpoint B 330 may respond with standard CREATE_CHILD_SA response to endpoint A 310. As an example and not by way of limitation, the one or more second responses may include the CREATE_CHILD_SA response. In certain embodiments, the CREATE_CHILD_SA response may indicate no duplicate SAs created by endpoint B 330.

At operation 318, endpoint A 310 may receive the child SA rekey response from endpoint B 330, for which the rekey is successfully completed. In certain embodiments, the task of simultaneous SA rekeying may be completed based on non-duplicate SAs.

At operation 338, endpoint B 330 may receive the response from endpoint A 310. Endpoint B 330 may process DUP_SA_DETECTED notification from endpoint A. The endpoint with the lower nonce (endpoint B 330) can still retry rekey request after some time, if the rekey has not happened.

To this end, IPsec SA in use 320 for endpoint A 310 may include 2 SA (1 old SA and 1 rekey SA) for inbound and outbound, respectively. IPsec SA in use 340 for endpoint B 330 may include 2 SA (1 old SA and 1 rekey SA) for inbound and outbound, respectively. As may be seen, non-duplicate SAs are established for the secure tunnel associated with endpoint A 310 and endpoint B 330. Endpoint A 310 may delete the old child SA associated with endpoint A 310.

At operation 322, endpoint A 310 may send a delete request for old child SA (e.g., IKE_DELETE). In certain embodiments, an old child SA may indicate a previously established child SA before current rekey process. At operation 342, endpoint B 330 may receive the delete request from endpoint A 310. Endpoint B 330 may process the delete request.

At operation 344, endpoint B 330 may send a response with the deletion of its only inbound security parameter index (SPI).

At operation 324, endpoint A 310 may receive the response with the deletion of inbound SPI from endpoint B 330. To this end, the child SA rekey is complete. IPsec SA in use 326 for endpoint A 310 may include 1 SA for inbound and 1 SA for outbound. IPsec SA in use 346 for endpoint B 330 may include 1 SA for inbound and 1 SA for outbound.

As illustrated in FIG. 3, rekey SA collision may be prevented by exchanging an early duplication detection (e.g., EARLY_DUP_DETECTION) capability as part of initial SA bring-up by both participants. In a scaled setup, early duplicate SA (DUP SA) detection of concurrent IPsec SA rekey may avoid consuming redundant security associations and thus help achieve better tunnel scale support.

Figure 4:
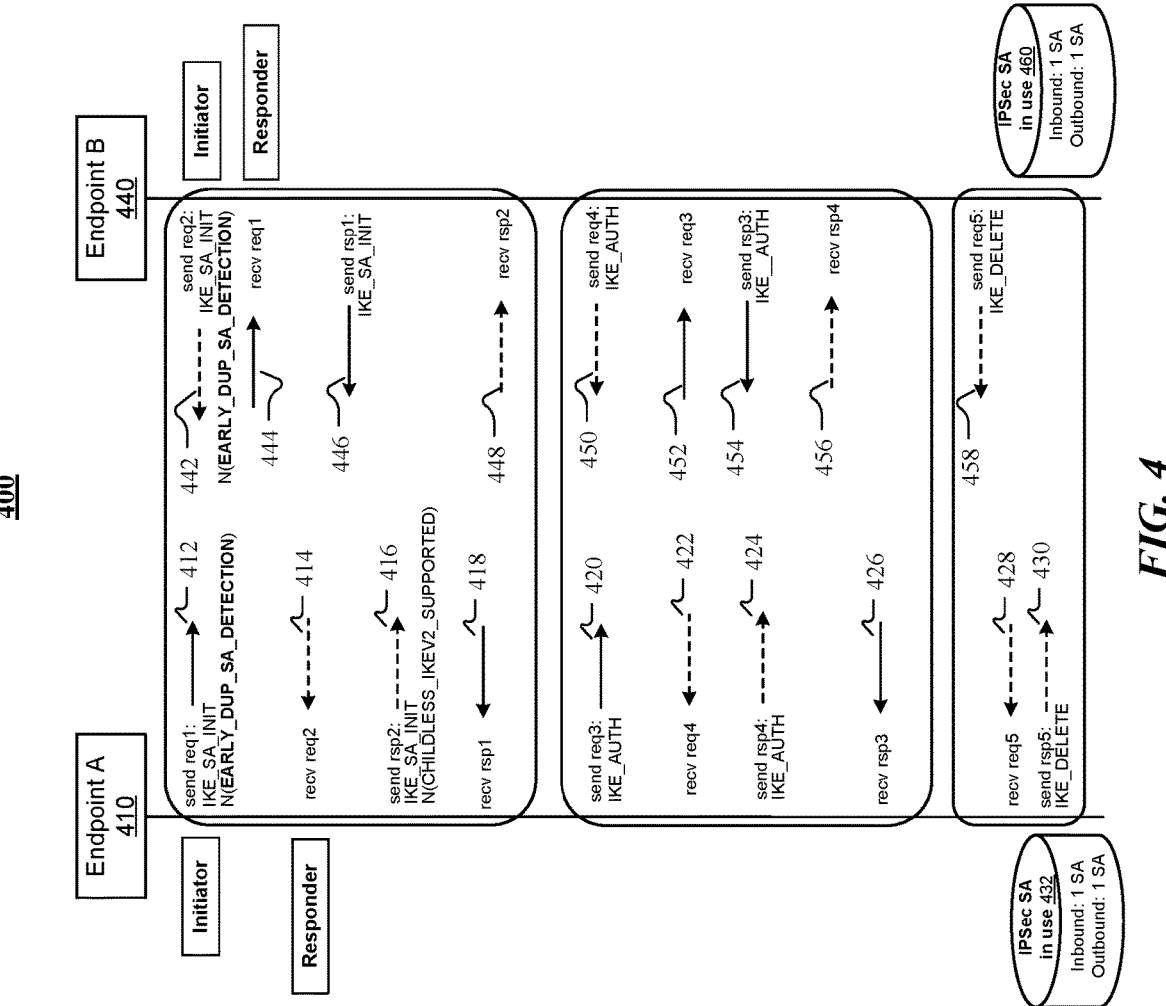
FIG. 4 illustrates a sequence diagram for simultaneous SA initial exchange, in accordance with certain embodiments.

FIG. 4 illustrates a sequence diagram 400 for simultaneous SA initial exchange, in accordance with certain embodiments. In certain embodiments, endpoint A 410 may be the first electronic device whereas endpoint B 440 may be the second electronic device. Endpoint A 410 and endpoint B 440 may be associated with a secure tunnel. Both participants, e.g., endpoint A 410 and endpoint B 440 may advertise an early duplication SA detection (e.g., EARLY_DUP_SA_DETECTION) capability in the SA_INIT request. Both participants, e.g., endpoint A 410 and endpoint B 440, may act as initiator and responder.

At operation 412, endpoint A 410 may send an initiation request to endpoint B 440, advertising EARLY_DUP_SA_DETECTION support in the notification payload.

At operation 442, endpoint B 440 may send an initiation request to endpoint A 410, advertising EARLY_DUP_SA_DETECTION support in the notification payload.

As an example and not by way of limitation, the first initiation request may include the initiation request from endpoint A 410 whereas the second initiation request may include the initiation request from endpoint B 440.

At operation 414, endpoint A 410 may receive the initiation request from endpoint B 440. Endpoint A 410 may know that there is a simultaneous IKE SA bring-up happening.

At operation 444, endpoint B 440 may receive the initiation request from endpoint A 410. Endpoint B 440 may know that there is a simultaneous IKE SA bring-up happening.

Once an endpoint detects a simultaneous IKE SA bring-up, it may compare the nonce sent in its SA_INIT request with the nonce received in the peer-initiated request. SA_INIT request with the greater nonce may continue with standard SA_INIT response. The endpoint which receives the lower nonce in the SA_INIT request may respond with CHILDLESS_IKE_SUPPORTED notify payload in the SA_INIT response. The payload is defined in RFC 6023, which is incorporated herein by reference.

As an example and not by way of limitation, since endpoint B 440 has lower nonce, endpoint A 410 may send IKE_SA_INIT response with CHILDLESS_IKE_SUPPORTED notification payload at operation 416. Since endpoint A 410 has higher nonce and has initiated the current request, endpoint B 440 may continue with the usual IKE_SA_INIT response at operation 446. As an example and not by way of limitation, the one or more first responses may include the IKE_SA_INIT response with CHILDLESS_IKE_SUPPORTED notification payload. The one or more second responses may include the usual IKE_SA_INIT response.

At operation 418, endpoint A 410 may receive and process the initiation response from endpoint B 440.

At operation 420, endpoint A 410 may continue with an IKE authorization (e.g., IKE_AUTH) request as defined in RFC 7296 and send it to endpoint B 440.

At operation 448, endpoint B 440 may receive and process the initiation response from endpoint A 410. Endpoint B 440 may support childless IKE feature and continue with a modified IKE authorization request without the child SA and traffic selector payload.

At operation 450, endpoint B 440 may send the modified IKE authorization request without the child SA and traffic selector payload to endpoint A 410.

At operation 422, endpoint A 410 may receive and process the modified authorization request from endpoint B 440. The modified authorization request may have only the identity and authorization payload of the parent IKE SA.

Endpoint A 410 may complete the negotiation with an IKE authorization (e.g., IKE_AUTH) response and send the response to endpoint B 440 at operation 424. As an example and not by way of limitation, the one or more first responses may include the IKE authorization response from endpoint A 410. At this point, childless IKE_SA2 may be established.

At operation 452, endpoint B 440 may receive and process the authorization request from endpoint A 410. The authorization request may have the child SA details.

Endpoint B 440 may complete the negotiation with an IKE authorization (e.g., IKE_AUTH) response and send the response to endpoint A 410 at operation 454. As an example and not by way of limitation, the one or more second responses may include the IKE authorization response from endpoint 440. At this point, IKE_SA1 and an IPSec child SA may be established.

At operation 426, endpoint A 410 may receive and process the authorization response from endpoint B 440, which completes the exchange with endpoint A 410 as the initiator. In addition, IKE_SA1 and an IPSec child SA may be established.

At operation 456, endpoint B 440 may receive and process the authorization response from endpoint A 410, which completes the exchange with endpoint B 440 as the initiator. In addition, the childless IKE_SA2 may be established.

In certain embodiments, the task of simultaneous SA initial exchange may be completed based on non-duplicate SAs. The one or more non-duplicate SAs may be established for the secure tunnel between endpoint A 410 and endpoint B 440.

At this point, endpoint A 410 may have two IKE security associations which include IKE_SA1 and childless IKE_SA2. Endpoint B 440 may also have two IKE security associations which include IKE_SA1 and childless IKE_SA2. Since endpoint B 440 was the initiator of childless IKE_SA2, it may initiate the deletion for the childless IKE_SA2. At operation 458, endpoint B 440 may send the deletion request, e.g., IKE_DELETE, to endpoint A 410.

At operation 428, endpoint A 410 may receive the deletion request from endpoint B 440. At operation 430, endpoint A 410 may delete the childless IKE_SA2 and send a corresponding response to endpoint B 440. To this end, IPsec SA in use 432 for endpoint A 410 may include 1 SA for inbound and 1 SA for outbound. IPsec SA in use 460 for endpoint B 440 may include 1 SA for inbound and 1 SA for outbound.

As illustrated in FIG. 4, in the IKE SA authentication (e.g., IKE_SA_AUTH) phase, both exchanges may continue for the IKE authentication (e.g., IKE_AUTH) phase. However, only the request initiated by endpoint A 410 may result into IPsec SA. After IPsec SA is established, the duplicate childless IKE SA may be deleted. If the intended IKE SA does not come up, the IPsec SAs can still be established using the childless IKE SA.

Figure 5A:
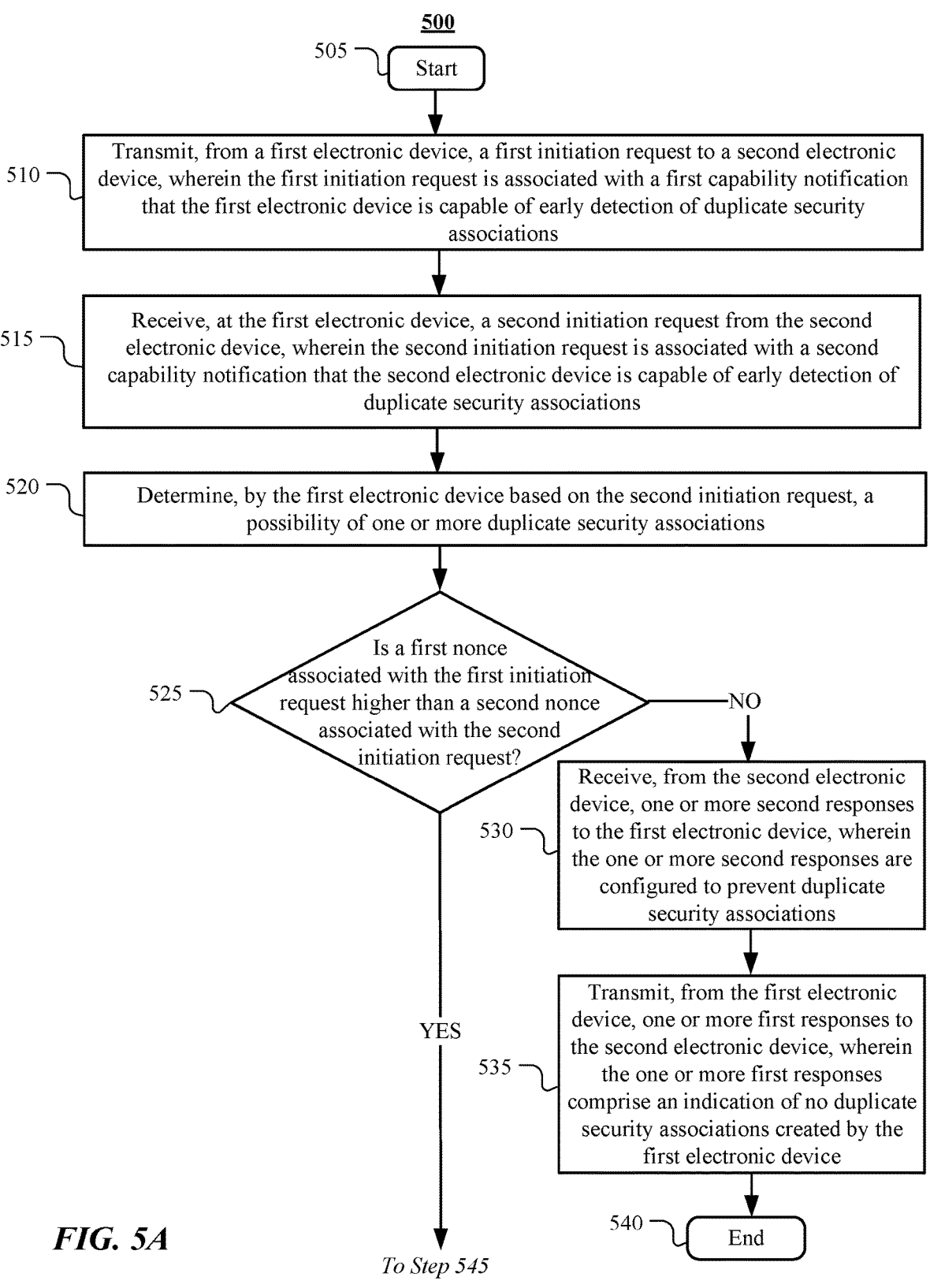

FIGS. 5A-5B illustrate a flow diagram of a method 500 for early detection of duplicate SA, in accordance with certain embodiments. In an embodiment, the steps of method 500 may be performed by a first electronic device such as a router. The method may start at step 505.

At step 510, the first electronic device (e.g., endpoint A of FIGS. 3-4) may transmit, from the first electronic device, a first initiation request to a second electronic device (e.g., endpoint B of FIGS. 3-4). The first initiation request may be associated with a first capability notification that the first electronic device is capable of early detection of duplicate SAs. As an example and not by way of limitation, the first capability notification may be EARLY_DUP_SA_DETEC-TION as exemplified in FIGS. 3-4.

At step 515, the first electronic device may receive, at the first electronic device, a second initiation request from the second electronic device. The second initiation request may be associated with a second capability notification that the second electronic device is capable of early detection of duplicate security associations. As an example and not by way of limitation, the second capability notification may be EARLY_DUP_SA_DETECTION as exemplified in FIGS. 3-4.

At step 520, the first electronic device may determine, based on the second initiation request, a possibility of one or more duplicate security associations.

At step 525, the first electronic device may compare a first nonce associated with the first initiation request and a second nonce associated with the second initiation request to determine whether the first nonce is higher than the second nonce.

If the first nonce is lower than the second nonce, the method 500 may proceed to step 530. At step 530, the first electronic device may receive, from the second electronic device, one or more second responses to the first electronic device. The one or more second responses may be config-ured to prevent duplicate security associations.

At step 535, the first electronic device may transmit, from the first electronic device, one or more first responses to the second electronic device. The one or more first responses may comprise an indication of no duplicate security asso-ciations created by the first electronic device. The method may then end at step 540

If the first nonce is higher than the second nonce, the method 500 may proceed to step 545. At step 545, the first electronic device may transmit, from the first electronic device, one or more first responses to the second electronic device. The one or more first responses may be configured to prevent duplicate security associations.

At step 550, the first electronic device may receive, at the first electronic device, one or more second responses from the second electronic device. The one or more second responses may comprise an indication of no duplicate secu-rity associations created by the second electronic device.

At step 555, the first electronic device may establish a non-duplicate security association for the first and second electronic devices responsive to the one or more second responses.

At step 560, the first electronic device may delete one or more useless security associations associated with the first electronic device. As an example and not by way of limi-tation, the useless security association may be an old child SA as exemplified in FIG. 3. As another example and not by way of limitation, the useless security association may be the childless IKE SA as exemplified in FIG. 4.

At step 565, the first electronic device may complete a task associated with the first and second initiation requests based on the non-duplicate security association. As an example and not by way of limitation, the task may be simultaneous IPsec SA rekeying as exemplified in FIG. 3. As another example and not by way of limitation, the task may be simultaneous SA initial exchange as exemplified in FIG. 4

At step 570, the method may end.

Although this disclosure describes and illustrates particu-lar steps of method 500 of FIG. 5 as occurring in a particular order, this disclosure contemplates any suitable steps of method 500 of FIG. 5 occurring in any suitable order.

Although this disclosure describes and illustrates an example method for early detection of duplicate SA including the particular steps of method 500 of FIG. 5, this disclosure contemplates any suitable method for early detection of duplicate SA including any suitable steps, which may include all, some, or none of the steps of method 500 of FIG. 5, where appropriate. Furthermore, although FIG. 5 describes and illustrates particular components, devices, or systems carrying out particular actions, this disclosure contemplates any suitable combination of any suitable components, devices, or systems carrying out any suitable actions.

Figure 6:
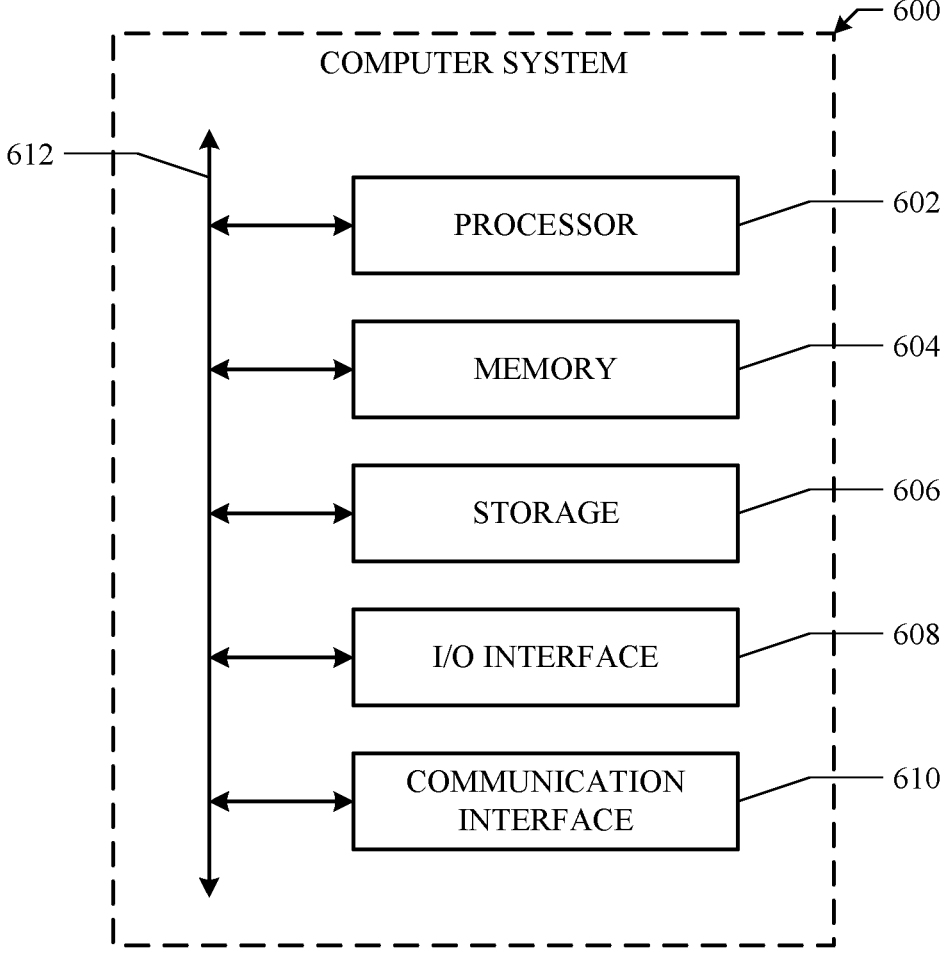
FIG. 6 illustrates a computer system, in accordance with certain embodiments.

FIG. 6 illustrates a computer system 600, in accordance with certain embodiments. In particular embodiments, one or more computer system 600 perform one or more steps of one or more methods described or illustrated herein. In particular embodiments, one or more computer system 600 provide functionality described or illustrated herein. In particular embodiments, software running on one or more computer system 600 performs one or more steps of one or more methods described or illustrated herein or provides functionality described or illustrated herein. Particular embodiments include one or more portions of one or more computer system 600. Herein, reference to a computer system may encompass a computing device, and vice versa, where appropriate. Moreover, reference to a computer system may encompass one or more computer systems, where appropriate.

This disclosure contemplates any suitable number of computer system 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer system 600; be unitary or distributed; span multiple locations; span multiple machines; span multiple data centers; or reside in a cloud, which may include one or more cloud components in one or more networks. Where appropriate, one or more computer system 600 may perform without substantial spatial or temporal limitation one or more steps of one or more methods described or illustrated herein. As an example, and not by way of limitation, one or more computer system 600 may perform in real time or in batch mode one or more steps of one or more methods described or illustrated herein. One or more computer system 600 may perform at different times or at different locations one or more steps of one or more methods described or illustrated herein, where appropriate.

In particular embodiments, computer system 600 includes a processor 602, a memory 604, a storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate.

Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer system 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. A first electronic device, comprising:
one or more processors; and
one or more computer-readable non-transitory storage media comprising instructions that, when executed by the one or more processors, cause one or more components of the first electronic device to perform operations comprising:
transmitting, from the first electronic device to a second electronic device, a first initiation request to initiate a security association (SA) by the first electronic device, wherein the first initiation request is associated with a first capability notification that the first electronic device is capable of early detection of duplicate SAs before programming the duplicate SAs into the first electronic device;
receiving, at the first electronic device from the second electronic device, a second initiation request to initiate a SA by the second electronic device, wherein the second initiation request is associated with a second capability notification that the second electronic device is capable of early detection of duplicate SAs before programming the duplicate SAs into the second electronic device;
determining, by the first electronic device based on detecting both the first and second electronic devices have sent respective initiation requests comprise the first initiation request and the second initiation request, a risk of one or more duplicate SAs to be established for the first and second electronic devices;
transmitting, from the first electronic device, one or more first responses to the second electronic device, wherein the one or more first responses are configured to prevent duplicate SAs;
receiving, at the first electronic device, one or more second responses from the second electronic device, wherein the one or more second responses comprise an indication of no duplicate SAs created by the second electronic device responsive to receiving the one or more first responses; and
establishing, by the first electronic device, an SA for the first and second electronic devices responsive to the one or more second responses.

2. The first electronic device of claim 1, the operations further comprising:
determining, by the first electronic device, a first nonce associated with the first initiation request is higher than a second nonce associated with the second initiation request, wherein the one or more first responses are generated based on determining the first nonce is higher than the second nonce.

3. The first electronic device of claim 1, wherein:
the first electronic device and the second electronic device are associated with a secure tunnel; and
the SA are established for the secure tunnel.

4. The first electronic device of claim 1, wherein the one or more first responses comprise an error notification indicating that one or more duplicate SAs have been detected.

5. The first electronic device of claim 1, wherein:
the first electronic device functions as both an initiator and a responder; and
the second electronic device functions as both an initiator and a responder.

6. The first electronic device of claim 1, wherein the first and second initiation requests are associated with a particular task, the operations further comprising:
completing, by the first electronic device, the particular task based on the established SA.

7. The first electronic device of claim 1, wherein:
the first and second initiation requests are associated with a task of simultaneous SA rekeying; and
the first or second initiation request comprises a child SA rekey request.

8. The first electronic device of claim 7, wherein the one or more second responses comprise a response indicating standard creation of child SA.

9. The first electronic device of claim 7, the operations further comprising:
deleting, by the first electronic device, an old child SA associated with the first electronic device; and
transmitting, from the first electronic device to the second electronic device, a request to delete an old child SA associated with the second electronic device.

10. The first electronic device of claim 1, wherein:
the first and second initiation requests are associated with a task of simultaneous SA initial exchange; and
the first or second initiation request comprises an SA initiation request.

11. The first electronic device of claim 10, wherein the one or more first responses comprise a response indicating a support for childless Internet key exchange (IKE) by the first electronic device.

12. The first electronic device of claim 11, the operations further comprising:
transmitting, from the first electronic device, an IKE authorization request to the second electronic device; and
receiving, at the first electronic device, a modified IKE authorization request without a child SA from the second electronic device.

13. The first electronic device of claim 12, wherein:
the one or more first responses further comprise an IKE authorization by the first electronic device; and
the one or more second responses comprise an IKE authorization by the second electronic device.

14. The first electronic device of claim 10, the operations further comprising:
receiving, at the first electronic device, a request from the second electronic device to delete a childless Internet key exchange (IKE) SA associated with the first electronic device; and
deleting, by the first electronic device, the childless IKE SA associated with the first electronic device.

15. A method, comprising:
transmitting, from a first electronic device to a second electronic device, a first initiation request to initiate a security association (SA) by the first electronic device, wherein the first initiation request is associated with a first capability notification that the first electronic device is capable of early detection of duplicate SAs before programming the duplicate SAs into the first electronic device;

receiving, at the first electronic device from the second electronic device, a second initiation request to initiate a SA by the second electronic device, wherein the second initiation request is associated with a second capability notification that the second electronic device is capable of early detection of duplicate SAs before programming the duplicate SAs into the second electronic device;

determining, by the first electronic device based on detecting both the first and second electronic devices have sent respective initiation requests comprise the first initiation request and the second initiation request, a risk of one or more duplicate SAs to be established for the first and second electronic devices;

transmitting, from the first electronic device, one or more first responses to the second electronic device, wherein the one or more first responses are configured to prevent duplicate SAs;

receiving, at the first electronic device, one or more second responses from the second electronic device, wherein the one or more second responses comprise an indication of no duplicate SAs created by the second electronic device responsive to receiving the one or more first responses; and establishing, by the first electronic device, an SA for the first and second electronic devices responsive to the one or more second responses.

16. The method of claim 15, further comprising:

determining, by the first electronic device, a first nonce associated with the first initiation request is higher than a second nonce associated with the second initiation request, wherein the one or more first responses are generated based on determining the first nonce is higher than the second nonce.

17. The method of claim 15, wherein the one or more first responses comprise an error notification indicating that one or more duplicate SAs have been detected.

18. A non-transitory computer-readable medium comprising instructions that are configured, when executed by a processor, to:

transmit, from a first electronic device to a second electronic device, a first initiation request to initiate a security association (SA) by the first electronic device, wherein the first initiation request is associated with a first capability notification that the first electronic device is capable of early detection of duplicate SAs before programming the duplicate SAs into the first electronic device;

receive, at the first electronic device from the second electronic device, a second initiation request to initiate a SA by the second electronic device, wherein the second initiation request is associated with a second capability notification that the second electronic device is capable of early detection of duplicate SAs before programming the duplicate SAs into the second electronic device;

determine, by the first electronic device based on detecting both the first and second electronic devices have sent respective initiation requests comprise the first initiation request and the second initiation request, a risk of one or more duplicate SAs to be established for the first and second electronic devices;

transmit, from the first electronic device, one or more first responses to the second electronic device, wherein the one or more first responses are configured to prevent duplicate SAs;

receive, at the first electronic device, one or more second responses from the second electronic device, wherein the one or more second responses comprise an indication of no duplicate SAs created by the second electronic device responsive to receiving the one or more first responses; and establish, by the first electronic device, an SA for the first and second electronic devices responsive to the one or more second responses.

19. The non-transitory computer-readable medium of claim 18, further comprising instructions that are configured, when executed by a processor, to:

determine, by the first electronic device, a first nonce associated with the first initiation request is higher than a second nonce associated with the second initiation request, wherein the one or more first responses are generated based on determining the first nonce is higher than the second nonce.

20. The non-transitory computer-readable medium of claim 18, wherein the one or more first responses comprise an error notification indicating that one or more duplicate SAs have been detected.

* * * * *